(12) United States Patent
Inoue

(10) Patent No.: US 8,206,195 B2
(45) Date of Patent: Jun. 26, 2012

(54) SHOOTING TOY USED IN GAME FOR TWO OR MORE PLAYERS

(75) Inventor: Manabu Inoue, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 604 days.

(21) Appl. No.: 12/520,597

(22) PCT Filed: Dec. 21, 2007

(86) PCT No.: PCT/JP2007/074742
§ 371 (c)(1),
(2), (4) Date: Jun. 22, 2009

(87) PCT Pub. No.: WO2008/078712
PCT Pub. Date: Jul. 3, 2008

(65) Prior Publication Data
US 2010/0062678 A1    Mar. 11, 2010

(30) Foreign Application Priority Data
Dec. 22, 2006  (JP) .................................. 2006-345455

(51) Int. Cl.
*A63F 9/02* (2006.01)
(52) U.S. Cl. ........................................ 446/175; 463/49

(58) Field of Classification Search ................... 446/175
See application file for complete search history.

(56) References Cited

U.S. PATENT DOCUMENTS

| | | | |
|---|---|---|---|
| 6,609,945 B2 * | 8/2003 | Jimenez et al. | 446/454 |
| 7,338,375 B1 * | 3/2008 | Small | 463/39 |
| 2003/0027640 A1 * | 2/2003 | Jeffway et al. | 463/49 |
| 2005/0197187 A1 | 9/2005 | Mitsuyoshi et al. | |

FOREIGN PATENT DOCUMENTS

| | | |
|---|---|---|
| JP | 2004-024584 | 1/2004 |
| JP | 2004-077080 | 3/2004 |
| JP | 2004-085033 | 3/2004 |
| JP | 2006-034823 | 2/2006 |

* cited by examiner

*Primary Examiner* — Tramar Harper
(74) *Attorney, Agent, or Firm* — Rankin, Hill & Clark LLP (57) ABSTRACT

A shooting toy used in a game for two or more players for enabling players to actually sense the thrill of close combat. The toy include an infrared ray signal generating section 25, an infrared ray signal receiving section 31, a damage value determining section 35, a radio signal transmitting section 37, a radio signal receiving section 39, a radio intensity determining section 41, a damage state determining section 49, and a damage state representing section 51. The damage value determining section 35 changes the parameter value depending on the determination result by the radio intensity determining section 41.

21 Claims, 8 Drawing Sheets

SHOOTING TOY USED IN GAME FOR TWO OR MORE PLAYERS

TECHNICAL FIELD

The present invention relates to a shooting toy used in a game for two or more players, with which the players exchange shots with one another by transmitting/receiving an infrared ray signal.

BACKGROUND ART

Jpn. Pat. Appln. Laid-Open Publication No. 2006-34823 (Patent Document 1) discloses a shooting game system in which a toy robot (shooting toy used in a game for two or more players) capable of transmitting/receiving an infrared ray signal is radio-controlled to exchange shots with another robot. When one robot receives an infrared ray signal generated from another robot, it transmits an impact signal (radio signal) indicating that it has received an attack to a game determining unit.

Further, Jpn. Pat. Appln. Laid-Open Publication No. 2004-24584 (Patent Document 2) discloses a ray gun type toy (shooting toy used in a game for two or more players) that generates an infrared ray signal including identifier identifying a player who generates the infrared ray signal. The ray gun type toy disclosed in Patent Document 2 is provided with a display section that displays the player who has generated the infrared ray signal and details of the attack by the identified user.

Patent Document 1: Jpn. Pat. Appln. Laid-Open Publication No. 2006-34823

Patent Document 2: Jpn. Pat. Appln. Laid-Open Publication No. 2004-24584

DISCLOSURE OF THE INVENTION

Problems to be Solved by the Invention

Conventional shooting toys used in a game for two or more players have been developed focusing on detection on whether, or from whom a player has received virtual bullet in the form of an infrared ray signal, and how much damage the player has received. In the conventional shooting toys, players play with the same feeling irrespective of whether the players are close to each other or far away from each other. Therefore, the players cannot actually sense the thrill of close combat, with the result that a game itself becomes monotonous.

An object of the present invention is to provide a shooting toy used in a game for two or more players, with which players can actually sense the thrill of close combat.

Another object of the present invention is to provide a shooting toy used in a game for two or more players capable of reflecting a distance between shooting toys in the magnitude of damage that one shooting toy does to another.

Still another object of the present invention is to provide a shooting toy used in a game for two or more players in which one player can feel the distance between himself and a shooting toy of another player as well as recognize the shooting toy of another player.

Still another object of the present invention is to provide a shooting toy used in a game for two or more players in which one player can realize that damage that he or she does to a shooting toy of another player changes in accordance with the distance between him- or herself and the enemy.

Still another object of the present invention is to provide a shooting toy used in a game for two or more players in which one player can enjoy an advantage when he or she has succeeded in shooting at short range.

Still another object of the present invention is to provide a shooting toy used in a game for two or more players capable of outputting distance information between a shooting toy of one player and shooting toy of another player.

Means for Solving the Problems

In order to enable players to actually sense the thrill of close combat, a shooting toy used in a game for two or more players includes an infrared ray signal generating section, an infrared ray signal receiving section, a damage value determining section, a damage state determining section, a damage state representing section, a radio signal transmitting section, a radio signal receiving section, a radio intensity determining section. The infrared ray signal generating section generates an infrared ray signal for shooting. For example, when a ray gun toy is used as the shooting toy, a player operates a trigger so as to cause the infrared ray signal generating section to emit the infrared ray signal. The infrared ray signal serves as a virtual bullet emitted for giving damage to an opponent or shooting gun of an opponent.

The infrared ray signal receiving section receives an infrared ray signal emitted from a shooting gun of another player. The infrared ray signal receiving section may have any suitable configuration. For example, the infrared ray signal receiving section may include a receiving sensor for receiving the infrared ray signal and a signal processor for processing a signal supplied from the receiving sensor. The receiving sensor and signal processor may be provided integrally, or separately. In the case where the receiving sensor and signal processor are provided separately from each other, the receiving sensor may be fitted to a location apart from the toy main body, such as head portion or chest portion of a player. The receiving sensor may be provided in the toy main body. The infrared ray signal receiving section notifies the damage value determining section that it has received the infrared ray signal emitted from a shooting toy of another player.

When the infrared ray signal receiving section receives the infrared ray signal, the damage value determining section determines the damage value based on the parameter value. In the present specification, the damage value denotes the damage amount corresponding to one hit that a player or shooting toy of a player has received in the form of the infrared ray signal emitted from a shooting toy of another player. Further, in the present specification, the parameter value is a parameter used for calculating the damage value. An operation formula that uses the parameter value may arbitrarily be defined. As is described later in detail, the present invention is characterized in that the damage value determining section changes the parameter value depending on the determination result of the radio intensity determination section.

The damage state determining section determines a damage state based on the damage value determined by the damage value determining section. Any suitable way of determining the damage state may be employed. For example, the damage state may be determined based on an accumulation of the damage values, or may be determined based on a value obtained by subtracting the damage value from a predetermined value. With this configuration, the total amount of the damage value that a player or shooting toy has received or residual amount of the damage that a player or shooting toy can tolerate can be determined as the damage state.

The damage state is represented outside by the damage state representing section. The damage state representing section may have any suitable configuration as long as the damage value and damage state can be confirmed visually, aurally, and/or tactually. For visual confirmation, a display screen may be used. For aural conformation, a sound emitting device such as a buzzer may be used. For tactual confirmation, a vibration generating device may be used. In particular, an image display section that visually represents the damage value and/or the damage state on a display screen may be provided as the damage state representing section. This configuration makes it easier for a player to confirm the damage value and/or damage state. Thus, the player can confirm how the battle is going during play.

The radio signal transmitting section transmits a predetermined radio signal. The predetermined radio signal is a radio signal of a predetermined frequency. Although the same frequency may be set in all the shooting toys, it is preferable that the frequency differs for each shooting toy. In the case where shooting toys are used in the game, the shooting toys may be divided into two or more groups. In this case, the frequency of the radio signal may be changed for each group. In the case where the same frequency may be set in all the shooting toys, identifier is included in the radio signal so as to allow the radio signal of each player to be identified.

The radio signal receiving section receives a radio signal emitted from a shooting toy of another player. In the case where a plurality of different frequencies are used, the radio signal receiving section having a function of identifying each of the plurality of frequencies is used. In the case where the same frequency is set in all the shooting toys, the radio signal receiving section having a function of identifying the identifier included in the radio signal may be used.

The radio signal transmitting section may transmit the radio signal during the game constantly, periodically, or under a predetermined condition. As the predetermined condition, the following conditions can be considered: the shooting toy transmits the radio signal when being moved at more than a predetermined speed; and the shooting toy transmits the radio signal at the same time when the infrared ray signal generating section generates the infrared ray signal.

The radio intensity determining section determines the radio intensity of the radio signal received by the radio signal receiving section. The radio signal attenuates after being output from the radio signal transmitting section, as it becomes away from the radio signal transmitting section. Therefore, if the intensity of the radio signal to be transmitted from the radio signal transmitting section is previously known, the determination of the intensity of the received radio signal allows calculation of a rough distance between the radio signal transmitting section of a shooting toy that has transmitted the radio signal and the radio signal receiving section of the shooting toy of another player that has received the radio signal. That is, by utilizing a determination result of the radio intensity determining section, it is possible to detect that an opponent or the shooting toy of the opponent is near the player or the player's shooting toy, that is, a state of close combat. In the present invention, the damage value determining section changes the parameter value depending on the determination result of the radio signal determination section. As a result, the damage value differs between at the time of close combat and at the time of non-close combat. For example, in order to achieve a configuration in which the power of an attack increases at the time of close combat, it is necessary to make a setting such that the parameter value increases with the increasing radio intensity determined by the radio intensity determining section. Conversely, in order to achieve a configuration in which the power of an attack decreases at the time of close combat (because the probability that a bullet hits a target becomes higher in close combat), it is necessary to make a setting such that the parameter value decreases with the increasing radio intensity determined by the radio intensity determining section. In each case, the parameter value changes depending on the determination result of the radio intensity determining section to cause the damage value to increase or decrease, thereby allowing players to be conscious of close combat. As a result, the player can experience a deeper thrill of the close combat than ever before.

Although the damage value determining section may change the parameter value in an arbitrary manner, it may change the parameter value in linear or stepwise proportion to the radio intensity determined by the radio intensity determining section. In the present invention, "proportion" includes both of the direct proportion and inverse proportion. With this configuration, the damage value becomes larger as the distance from the shooting toy of another player decreases. Further, the damage value determining section may be configured to determine to which one of two or more level ranges that have previously been set the radio intensity determined by the radio intensity determining section belongs and change the parameter value depending on the determined level range. With this configuration, it is necessary to set the parameter value for each level range, simplifying the configuration of the damage value determining section. Further, this causes the vibration to be increased or decreased suddenly, thereby further increasing the thrill.

The determination result of the radio intensity determination section may be used to directly notify the players of the close combat state. Any suitable configuration to represent the determination result outside may be used. In the case where the display screen is used to represent the determination result visually, a radio intensity display instruction generating section is provided in the image display section. The radio intensity display instruction generating section can be configured to give an instruction which is necessary to display the radio intensity determined by the radio intensity determination section to be confirmed visually on the display screen.

Further, a vibration generating section vibrating the shooting toy may be provided to transmit a vibration to the player's body while the radio intensity determined by the radio intensity determining section exceeds a prescribed level. As a result, even during the course of the game, a player can be aware of the close combat state by a vibration, increasing the thrill. In addition, when the player receives the vibration, he or she can immediately respond to the close combat, speeding up the game. Further, in this case, a function of changing the vibration such that the vibration increases with the increasing radio intensity may be added to the vibration generating section. With this configuration of the infrared ray signal generating section or radio signal transmitting section, the distance from an opponent can tactually be confirmed, thereby further increasing the thrill.

Further, in the present invention, the infrared ray signal generating section can be configured to generate an infrared ray signal including identifier to identify a source of the infrared ray signal. Further, the radio signal generating section can be configured to generate a radio signal including identifier to identify a source of the radio signal. With this configuration, it is possible to realize various functions using the identifier. For example, in the case where a plurality of players play the game using a plurality of the shooting toys, it is possible to recognize the attack by whom the damage has been caused or who exists in the neighborhood, and to notify an opponent of one's own damage amount. Further, the infrared ray signal generating section and radio signal transmitting section may be configured in such a manner that the identifier is included both in the infrared ray signal and radio signal so as to generate an infrared ray signal and radio signal. With this configuration, more functions can be added to the shooting toy.

In the case where identifier for identifying a source of the infrared ray signal or source of the radio signal is included, when the damage value determining section has a function of determining the identifier and a function of changing the parameter value based on the identifier, the parameter value can be determined based on the identifier. With this configuration, for example, it can be set for the parameter value not to change when the shooting toy in the neighborhood is the shooting toy of a friend and to change when the shooting toy in the neighborhood is the shooting of an enemy. Further, the parameter value may be changed for each shooting toy. That is, the parameter value can be changed not only for close combat but also depending on the performance of each shooting toy. As a result, the player can enjoy developing a game plan.

In the case where the radio signal transmitting section can transmit the radio signal including the identifier, an identifier examining section is provided in each shooting toy. In this case, the radio signal transmitting section may be configured to transmit the radio signal including information indicating the damage state. With this configuration, the identifier examining section of one player can identify the shooting toy of another player that has emitted the identifier and can notify the identified shooting toy of another player of the damage state of the one player and, accordingly, the another player that has given the damage can know the magnitude of the given damage.

As described above, when the radio signal is used to notify the shooting toy of another player that has emitted the infrared ray signal of the reception of the infrared ray signal, the another player can promptly check the damage value and/or the damage state of the shooting toy of one player caused by the infrared ray signal emitted from the shooting toy of another player, thus increasing enjoyment and excitement.

In the case where a plurality of players divided into friends and enemies play the game, a cooperative or collaborative attack by the shooting guns can be made to one shooting toy or a player having one shooting toy under a condition that the friends exist within a predetermined distance range. In this case, a function of outputting a cancellation signal is added to the radio intensity determining section. That is, when determining that the radio intensities of a plurality of received radio signals are larger than a predetermined radio intensity level, the radio intensity determining section outputs the cancellation signal. The cancellation signal is output when the radio intensities of a plurality of received radio signals are larger than predetermined radio intensity level so as to disable an output standby function provided in the infrared ray signal receiving section and/or determination standby function provided in the damage value determination section to be described later. As explained below, an output standby function and a disabling function are added to the infrared ray signal receiving section. The output standby function does not output a signal indicating a reception of an infrared ray signal during a time period from a reception of a previous infrared ray signal until a elapse of a predetermined time after the reception, even if a new infrared ray signal is received. The disabling function disables the output standby function while a cancellation signal is output from the radio intensity determining section. With this function, when it is determined that a plurality of enemies exist within the predetermined distance range, the cancellation signal is output from the radio intensity determination section. Thus, when attacks are simultaneously made by the enemies who are near the player, the cancellation signal disables the output standby function of the infrared ray signal receiving section, allowing reception of the infrared ray signals from the plurality of shooting toys of the enemies. As a result, damage amount can be increased within a few moments. In view of this, the player can enjoy developing a game plan.

In the case where the radio intensity determining section has a function of outputting a cancellation signal when determining that the radio intensities of a plurality of received radio signals are larger than a prescribed level, a determination standby function and a disabling function may be added to the damage value determining section. The determination standby function does not determine the damage value during a time period from the time when the infrared ray signal receiving section receives a previous infrared ray signal until a predetermined time has elapsed after the reception, even if the infrared ray signal receiving section receives a new infrared ray signal at the time period. The disabling function disables the determination standby function while a cancellation signal is output from the radio intensity determining section. With this configuration, a collaborative attack by a plurality of friends existing within a predetermined distance range with a plurality of the shooting toys is enabled.

The present invention is summarized as follows.

(1) A shooting toy used in a game for two or more players comprising: an infrared ray signal generating section that generates an infrared ray signal for shooting; an infrared ray signal receiving section that receives an infrared ray signal generated by a shooting toy of a different player; a damage value determining section that determines a damage value based on a parameter value when the infrared ray signal receiving section receives the infrared ray signal; a damage state determining section that determines a damage state based on the damage value; a damage state representing section that represents the damage value and the damage state such that they may visually, aurally, or tactually be confirmed; a radio signal generating section that generates a predetermined radio signal; a radio signal receiving section that receives a radio signal generated by the shooting toy of the different player; and a radio intensity determining section that determines a radio intensity of a radio signal received by the radio signal receiving section, wherein the damage value determining section changes the parameter value according to determination result made by the radio intensity determining section.

(2) The shooting toy used in a game for two or more players according to the above (1), wherein the damage value determining section changes the parameter value in linear or stepwise proportion to the radio intensity determined by the radio intensity determining section.

(3) The shooting toy used in a game for two or more players according to the above (1), wherein the damage value determining section determines in which level range the radio intensity determined by the radio intensity determining section falls among two or more predetermined level ranges, and changes the parameter value according to the determined level range.

(4) The shooting toy used in a game for two or more players according to the above (1), wherein the dame state determining section determines the damage state based on an accumulation of the damage value, or based on a value obtained by subtracting the damage value from a predetermined value.

(5) The shooting toy used in a game for two or more players according to the above (1), wherein the infrared ray signal generating section generates the infrared ray signal including identifier to identify a source of the infrared ray signal.

(6) The shooting toy used in a game for two or more players according to the above (1), wherein the radio signal generating section generates the radio signal including identifier to identify a source of the radio signal.

(7) The shooting toy used in a game for two or more players according to the above (1), wherein the infrared ray signal generating section generates the infrared ray signal including identifier to identify a source of the infrared ray signal, and the radio signal generating section generates the radio signal including identifier to identify a source of the radio signal.

(8) The shooting toy used in a game for two or more players according to the above (6) or (7), wherein the damage value determining section further has a function of examining the identifier and a function of changing the parameter value based on the identifier.

(9) The shooting toy used in a game for two or more players according to the above (6) or (7), further comprising an identifier examining section that examines the identifier, wherein the radio signal generating section further has a function of including in the radio signal a notification that indicates the damage state to the shooting toy of the different player who has generated or transmitted the identifier examined by the identifier examining section.

(10) The shooting toy used in a game for two or more players according to the above (6) or (7) further comprising an identifier examining section that examines the identifier, wherein the radio signal generating section further has a function of including in the radio signal a notification that indicates the damage state to the shooting toy of the different player who has generated or transmitted the identifier examined by the identifier examining section, and the radio signal generating section generates the radio signal that includes the notification indicating the damage state to the shooting toy of the different player who has generated or transmitted the identifier examined by the identifier examining section when the infrared ray signal receiving section receives the infrared ray signal.

(11) The shooting toy used in a game for two or more players according to the above (1), wherein the radio intensity determining section further has a function of outputting a disabling signal when it determines that a plurality of radio signals are at or beyond a predetermined radio intensity level, and the infrared ray signal receiving section has a function of standing by for output by until a predetermined time passes after a previous infrared ray signal has been received, without outputting a signal indicating that a subsequent infrared ray signal is received even if the infrared ray signal is received, and has a function of disabling the function of standing by for output while the radio intensity determining section is outputting the disabling signal.

(12) The shooting toy used in a game for two or more players according to the above (1), wherein the radio intensity determining section further has a function of outputting a disabling signal when it determines that an intensity of a plurality of radio signals is at or beyond a predetermined radio intensity level, and the damage value determining section has a function of standing by for determination by until a predetermined time passes after the infrared ray signal receiving section has received a previous infrared ray signal, without determining the damage value even if the infrared ray signal receiving section receives a subsequent infrared ray, and has a function of disabling the function of standing by for determination while the radio intensity determining section is outputting the disabling signal.

(13) The shooting toy used in a game for two or more players according to the above (1), wherein the damage state representing section includes an image display section provided with a display screen, and displays the damage value and/or the damage state on the display screen so as to be visually confirmed.

(14) The shooting toy used in a game for two or more players according to the above (12), wherein the image display section further includes a radio intensity display command generating section that outputs a necessary command to display on the display screen the radio intensity determined by the radio intensity determining section so as to be visually confirmed.

(15) The shooting toy used in a game for two or more players according to the above (1), further comprising a vibration generating section that vibrates the shooting toy while the radio intensity determining section is recognizing a state that the radio intensity is at or beyond a predetermined level.

(16) The shooting toy used in a game for two or more players according to the above (14), wherein the vibration generating section has a function of varying a vibration such that the vibration increases with the increasing radio intensity.

BEST MODE FOR CARRYING OUT THE INVENTION

Figure 1:
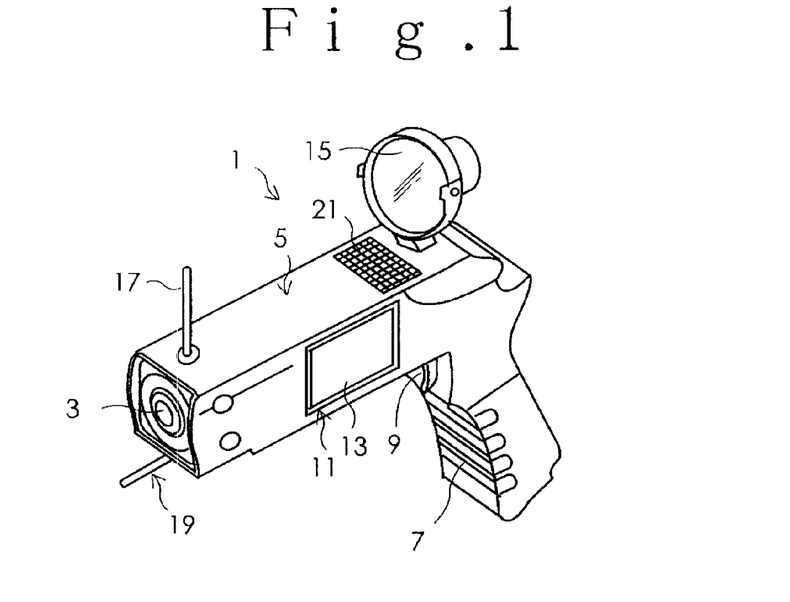
FIG. 1 is a perspective view showing a ray gun toy according to an embodiment of the present invention.
Figure 2:
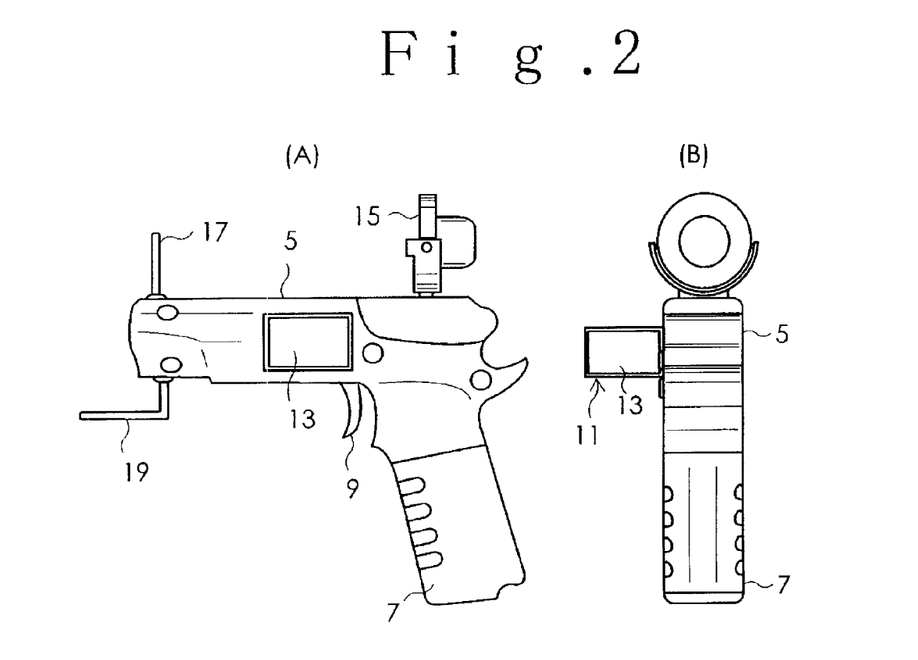
FIGS. 2(A) and 2(B) are a right side view of the ray gun toy according to the present embodiment and a rear side view thereof in a state where a display section is raised up, respectively.

An embodiment of a shooting toy used in a game for two or more players of the present invention will be described with reference to the accompanying drawings. FIG. 1 is a perspective view showing an example of an embodiment in which the shooting toy according to the present embodiment is applied to a ray gun toy. FIGS. 2(A) and 2(B) are a right side view of the ray gun toy of FIG. 1 and a rear side view thereof in a state where a display section is raised up, respectively. As shown in the drawings, the ray gun toy 1 includes a gun main body 5 having, at its one end, an infrared ray signal generating means 3 that emits an infrared ray signal and a grip portion 7 provided at the lower portion of the other end of the gun main body 5. The infrared ray signal generating means 3 may have any desired structure. An infrared ray LED may be used as a source of the infrared ray signal. The infrared ray signal generating means 3 has a structure capable of changing the emission angle of the infrared ray signal. Various electric components including the infrared ray LED and a signal processing section are incorporated in the gun main body 5.

A trigger portion 9 operated by a forefinger of a player who holds the grip portion 7 is provided at the lower potion of the gun main body 5 near the grip portion 7. A concave portion (not shown) for housing an image display means 11 is formed in one side wall of the gun main body 5. The image display means 11 is fixed to the gun main body 5 by a hinge provided at one side of the image display means 11 near the grip portion 7. In the example shown in FIG. 1 and FIG. 2(A), the image display means 11 is housed in the concave portion. In a state shown in FIG. 2B, the image display means 11 is pivoted upon the hinge to be raised up perpendicular to the gun main body 5. That is, in a state shown in FIG. 2(B), a player holding the grip portion 7 with his or her hand can view a display screen 13 of the image display means 11 during fight. An infrared ray signal receiving means 15 that receives an infrared ray signal emitted from the ray gun toy 1 of another player is fixed to the upper wall portion at the other end of the gun main body 5. When receiving an infrared ray signal, the infrared ray signal receiving means 15 converts the received signal into an electrical signal and transmits the electrical signal to an infrared ray signal receiving section 31 to be described later. A radio signal transmitting means 17 is fixed to the upper wall portion at the one end of The gun main body 5. A radio signal receiving means 19 is fixed to the bottom wall portion at the one end of the gun main body 5. Each of the radio signal transmitting means 17 and radio signal receiving means 19 function as an antenna for emitting and receiving a radio signal. As a matter of course, one antenna may be shared between the radio signal transmitting means 17 and radio signal receiving means 19, like a transceiver. A sound emitting section 21 that emits sound from a speaker incorporated in the gun main body 5 is provided at the upper wall of the gun main body 5. Although the ray gun toy 1 of the present embodiment is a short barrel pistol, the present invention can be applied to a ray gun toy of a rifle type having a long barrel or a machine gun type.

Figure 3:
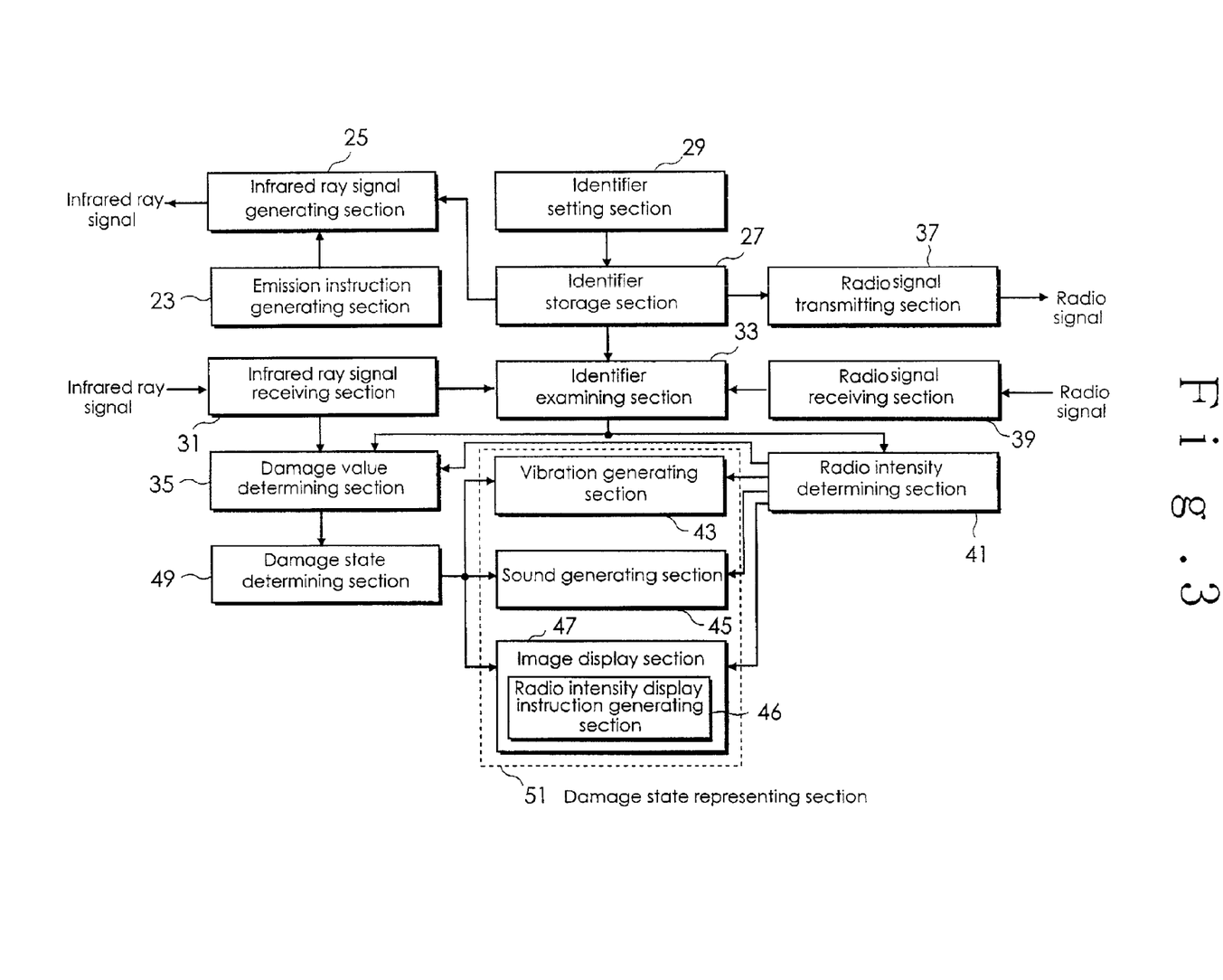
FIG. 3 is a block diagram showing an example of a configuration of a main part of the ray gun toy according to the embodiment of the present invention.

FIG. 3 is a block diagram showing an example of a configuration of a signal processing circuit incorporated in the gun main body 5 of the ray gun toy 1. The signal processing circuit includes an emission instruction generating section 23 that outputs an emission instruction when the trigger portion 9 as shown in FIG. 1 is operated and an infrared ray signal generating section 25 which is activated so as to emit an infrared ray signal from the infrared ray signal generating means 3 as shown in FIG. 1 when the emission instruction generating section 23 outputs the emission instruction. The infrared ray signal generating section 25 includes one or more infrared ray LEDs and a current control circuit for controlling the emission of the infrared ray LEDs by controlling electric current fed to the infrared ray LEDs. The infrared ray signal generating section 25 is configured to generate an infrared ray signal of a predetermined frequency only while it is receiving the emission instruction. The infrared ray signal generating section 25 may be configured to generate an infrared ray signal only for a predetermined time after the reception of one emission instruction and stop the output of the infrared ray signal after the predetermined time has passed or configured to intermittently generate an infrared ray signal while it is receiving the emission instruction. The infrared ray signal is a signal serving as a virtual bullet emitted for damaging an opponent or ray gun toy of the opponent. The infrared ray signal generating section 25 of the present embodiment generates an infrared ray signal including identifier for identifying a source of the infrared ray signal. Each ray gun toy stores its own identifier in an identifier storage section 27. In the present embodiment, each ray gun toy stores not only its own identifier but also identifier for identifying the ray gun toy of an opponent in the identifier storage section 27. The identifier of the opponent can be set by an identifier setting section 29. The identifier of all the ray gun toys that can participate in the game may previously be stored in the identifier storage section 27. In this embodiment, the identifier can be included in the infrared ray signal by changing the frequency of the infrared ray signal. Further, identifier can be included in the infrared ray signal by superimposing an identifier signal on the infrared ray signal of a basic frequency. Further, in the case where a large number of ray gun toys 1 are divided into friends and enemies, information indicating the friends or enemies can be included in the identifier. This information can be set by using the identifier setting section 29.

The signal processing circuit shown in FIG. 3 includes an infrared ray signal receiving section 31 that processes an infrared ray signal, when the infrared ray signal receiving means 15 shown in FIG. 1 receives the infrared ray signal emitted from an opponent's toy. The infrared ray signal receiving section 31 has a function of converting the received infrared ray signal into an electrical signal. When receiving the infrared ray signal receiving section 31 receives the infrared ray signal, the infrared ray signal receiving section 31 outputs a converted electrical signal to an identifier examining section 33 and a damage value determining section 35 to be described later.

The signal processing circuit further includes a radio signal transmitting section 37 that constantly transmits a radio signal of a predetermined frequency to the surrounding area. All the ray gun toys 1 used in the game use a radio signal having the same frequency. Thus, the identifier for identifying a source of the radio signal is included in the radio signal to use the same frequency. In the present embodiment, the radio signal transmitting section 37 transmits the radio signal including the own identifier stored in the identifier storage section 27. Therefore, it is possible to clearly distinguish between the radio signal that the ray gun toy 1 of one's own transmits and radio signal that the ray gun toy 1 of an opponent transmits.

The radio signal transmitting section 37 used in the present embodiment constantly transmits a radio signal during the game. Alternatively, however, the radio signal transmitting section 37 may transmit the radio signal periodically or under a predetermined condition. As the predetermined condition, the following conditions can be considered: when being moved at more than a predetermined acceleration or a predetermined speed which is measured by an acceleration sensor mounted on the ray gun toy 1, the radio signal transmitting section 37 transmits the radio signal at the same time when the infrared ray signal generating section 25 generates the infrared ray signal or at the same time when the ray gun toy 1 receives the infrared ray signal that the ray gun toy 1 of another player generates.

The signal processing circuit further includes a radio signal receiving section 39 that receives a radio signal that the ray gun toy 1 of another player transmits. The radio signal receiving means (antenna) 19 shown in FIG. 1 is included in the radio signal receiving section 39. In the case where the frequency of the radio signal differs for each ray gun toy 1, a function of distinguishing a plurality of frequencies from one another is added to the radio signal receiving section 39. Since the same frequency is used in all the ray gun toys 1 in the present embodiment, the radio signal received by the radio signal receiving section 39 is input to the identifier examining section 33. The identifier examining section 33 identifies a source of the radio signal based on the identifier included in the radio signal. The received radio signal is input to a radio intensity determining section 41.

The radio intensity determining section 41 determines the radio intensity of the radio signal received by the radio signal receiving section 39. The radio signal transmitted from the ray gun toy 1 of another player attenuates, after being output from the radio signal transmitting section 37 included in the ray gun toy of an another player, as it becomes away from the radio signal transmitting section 37. Therefore, if the intensity of the radio signal to be transmitted from the radio signal transmitting section 37 is previously known, the determination of the intensity of the received radio signal allows calculation of a rough distance between the radio signal transmitting section 37 of the ray gun toy 1 of another player that has transmitted the radio signal and the radio signal receiving section 39 of the player's ray gun toy that has received the radio signal. That is, by utilizing a determination result of the radio intensity determining section 41, it is possible to detect that an opponent or the ray gun toy 1 of the opponent is near the player or the player's toy, that is, a state of close combat. In the present embodiment, the determination result of the radio intensity determining section 41 is supplied to a damage value determining section 35, a vibration generating section 43, a sound generating section 45, and an image display section 47.

The damage value determining section 35 determines a damage value based on a parameter value when the infrared ray signal receiving section 31 receives an infrared ray signal. Then, the damage value determining section 35 in the present embodiment changes the parameter value in accordance with the determination result of the radio intensity determining section 41. The damage value determining section 35 may change the parameter value in an arbitrary manner. For example, the damage value determining section 35 may change, in a continuous or stepwise manner, the parameter value in direct proportion to the radio intensity determined by the radio intensity determining section 41. With this configuration, the damage value becomes larger as the distance from the ray gun toy 1 of another player decreases. Further, the damage value determining section 35 may be configured to determine to which one of two or more level ranges that have previously been set the radio intensity determined by the radio intensity determining section 41 belongs and change the parameter value depending on the determined level range. With this configuration, it is only necessary to set the parameter value for each level range, simplifying the configuration of the damage value determining section 35. Since the parameter value may be set such that the magnitude of the vibration changes in accordance with the level range, vibration can be increased or decreased suddenly, thereby increasing the thrill.

At any rate, when the parameter value used in the determination of the damage value made by the damage value determining section 35 is changed in accordance with the determination result of the radio intensity determining section 41, the damage value differs between at the time of close combat and at the time of non-close combat. For example, in order to achieve a configuration in which the power of an attack increases at the time of close combat, it is only necessary to increase the parameter value with the increasing radio intensity determined by the radio intensity determining section 41. Conversely, in order to achieve a configuration in which the power of an attack decreases at the time of close combat because the probability that a bullet hits a target becomes higher, it is only necessary to decrease the parameter value in accordance with the determination result. In each case, the parameter value changes depending on the determination result of the radio intensity determining section 41 to cause the damage value to increase or decrease, thereby allowing players to be conscious of close combat.

In this example, the vibration generating section 43, the sound generating section 45 and the image display section 47 are used to directly notify the players who are in the close combat state, based on the determination result of the radio intensity determining section 41. The vibration generating section 43 is provided in the grip portion 7 shown in FIG. 1. The vibration generating section 43 has a function of changing the magnitude of vibration such that the magnitude of vibration increases with the increasing radio intensity in accordance with the determination result of the radio intensity determining section 41. By providing the vibration generating section 43, it is possible to transmit a vibration to the player's body while the radio intensity determined by the radio intensity determining section 41 exceeds a prescribed level. As a result, during the game, a player can be aware of the close combat state by the vibration. In particular, when the vibration generating section 43 having the function of changing the magnitude of vibration such that the magnitude of vibration increases with the increasing radio intensity is provided as the present embodiment, the distance from an opponent can tactually be confirmed by the magnitude of vibration, thereby increasing the thrill.

Further, in this example, the determination result of the radio intensity determining section 41 is represented as sound by the sound generating section 45. That is, the sound generating section 45 emits predetermined sound from a speaker provided in the gun main body 5 when the radio intensity becomes larger than a predetermined level based on the determination result by the radio intensity determination section 41. The sound is emitted outside from the sound emitting section 21 shown in FIG. 1. With the sound emitted by the sound generating section 45 in addition to the vibration generated by the vibration generating section 43, it is possible to increase an ambience.

Further, in this example, a radio intensity display instruction generating section 46 is provided. The radio intensity display instruction generating section 46 gives a necessary instruction to display the radio intensity, based on the determination result of the radio intensity determining section 41, on the image display section 47 including the image display means 11 having the display screen 13 shown in FIG. 1 in a visually comfirmable manner. Based on the instruction from the radio intensity display instruction generating section 46, the image display section 47 displays the radio intensity on the display screen 13 in an appropriate display mode such as a bar graph. With this configuration, a player can recognize the distance from an opponent by viewing the display screen 13 even before activation of the vibration generating section 43 and sound generating section 45. As a result, the player can enjoy developing a game plan.

The damage value determined by the damage value determining section 35 is input to a damage state determining section 49. The damage state determining section 49 determines a damage state based on the damage value determined by the damage value determining section 35. In this example, the damage state is determined based on an accumulation of the damage value. The damage state may be determined based on a value obtained by subtracting the damage value from a predetermined value. With this configuration, the total amount of the damage value that a player or ray gun toy 1 has received or residual amount of the damage that a player or ray gun toy 1 can tolerate can be determined as the damage state. The damage state thus determined is represented outside by a damage state representing section 51. In this example, the image display section 47 that visually represents the damage state, sound generating section 45 that aurally represents the damage state, and/or vibration generating section 43 that tactually represents the damage state are used as the damage state representing section 51. In this example, not only the damage state determined by the damage state determining section 49 but also the damage value input to the damage state determining section 49 is displayed on the display screen 13 (FIG. 1) included in the image display section 47. This configuration makes it easier for a player to confirm the damage value and/or damage state. Thus, the player can confirm how the battle is going in close combat during play and can develop the game plan based on the confirmation.

In this example, the identifier examining section 33 examines the identifier included in the infrared ray signal that the infrared ray signal receiving section 31 has received and identifier included in the radio signal that the radio signal receiving section 39 has received. Then, the determination results concerning the respective identifier are supplied to the damage value determining section 35 and the radio intensity determining section 41. The damage value determining section 35 has a function of determining, based on the examined identifier, whether the received infrared ray signal is one emitted from the ray gun toy 1 a friend or one emitted from that of an enemy and changing the parameter value depending on the determination result. In this example, when a player is hit by his or her friend, the parameter value is set larger as penalty. That is, in this example, the damage value determining section 35 acquires, from the identifier storage section 27, the identifier concerning the ray gun toy 1 of another player which has been identified by the infrared ray signal that the infrared ray signal receiving section 31 has received. Then, the damage value determining section determines the parameter value based on the acquired identifier. Further, the damage value determining section 35 changes the parameter value based on the determination result of the radio intensity determined by the radio intensity determining section 41 so as to determine the damage value.

Further, in the present example, the radio intensity determining section 41 has a function of differentiating, based on the examination result of the identifier examining section 33, between a case where the ray gun toy 1 of a friend is in the neighborhood and a case where the ray gun toy of an enemy is in the neighborhood, and adding the differentiation result to the examination result from the identifier examining section 33 and outputting it. Further, the vibration generating section 43, sound generating section 45 and/or radio intensity display instruction generating section 46 have a function of differentiating whether an approaching opponent is a friend or enemy and operating in such a manner that the differentiation can easily be confirmed. As a result, even in The case where a plurality of players plays the game, the friends and enemies can be differentiated.

The signal processing circuit in the above embodiment can be modified as follows. A function of transmitting, when the signal processing circuit receives the infrared ray signal, the radio signal from the radio signal transmitting section 37, and including, in the radio signal, the damage value determined by the damage value determining section 35 or damage state determined by the damage state determining section 49 and identifier of the ray gun toy 1 that has emitted the received infrared ray signal, may be added to the signal processing circuit. With this configuration, a player can play while confirming the damage of an opponent. In this case, a function of determining information indicating the damage amount of the opponent which is included in the radio signal is added to the identifier examining section 33. Further, an opponent damage amount display instruction generating section may be added to the signal processing circuit. The opponent damage amount display instruction generating section generates an instruction for displaying the examination result of the identifier examining section 33 on the image display section 47. Further, an additional configuration may be adopted. The additional configuration is so configured that the radio signal is used to inform a shooting toy 1 of one player that the ray gun toy 1 of the opponent has received the infrared ray signal emitted by the ray gun toy 1 of the one player. That is, when the ray gun toy 1 of the opponent transmits the radio signal including information indicating the reception of the infrared ray signal to the one player, the one player can promptly confirm the damage value and/or damage state of the opponent or the ray gun toy 1 of the opponent, thus increasing enjoyment and excitement.

Figure 4:
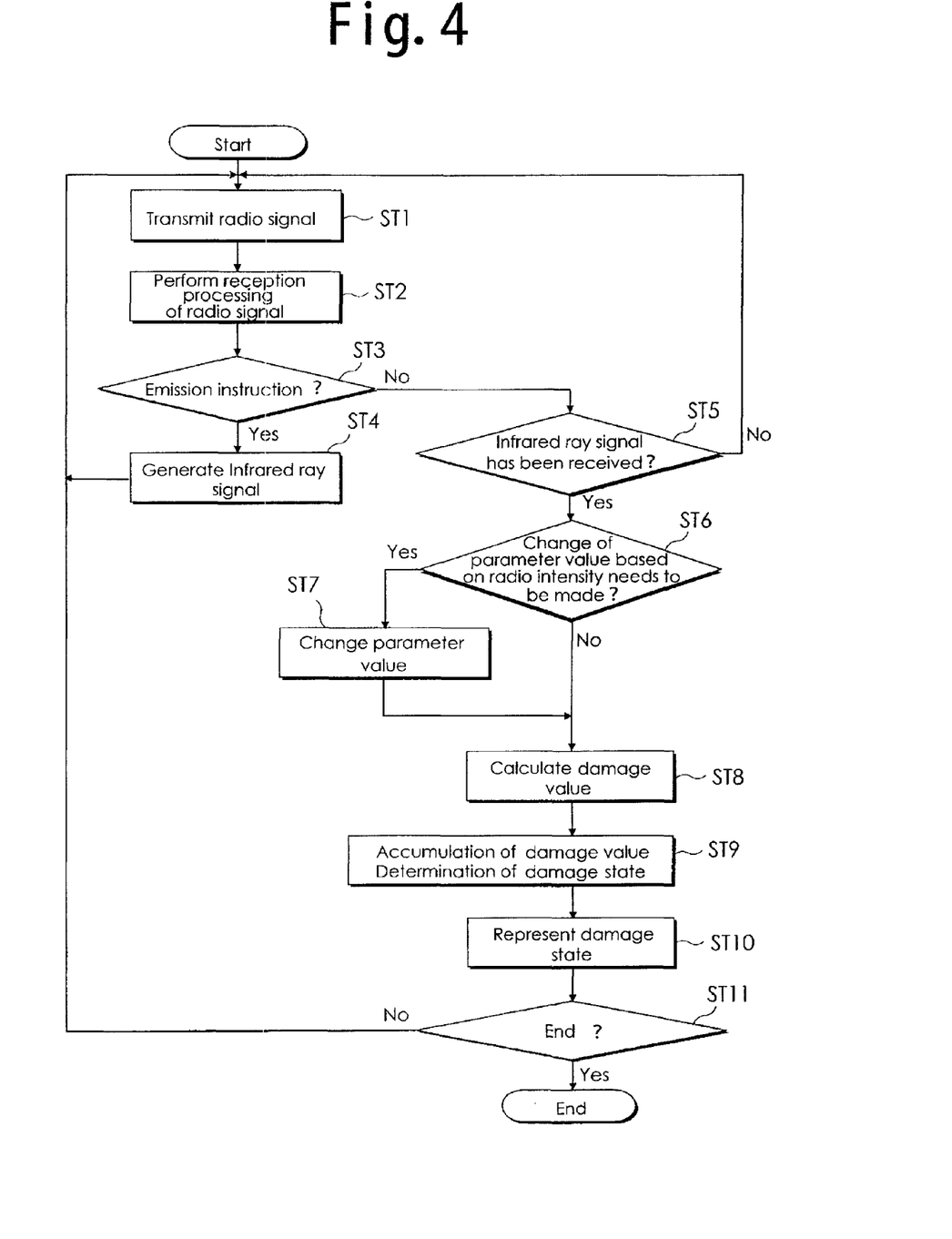
FIG. 4 is a flowchart showing an algorithm of a program used in the case where the embodiment of FIG. 1 is realized using a ray gun toy that does not use identifier.

FIG. 4 is a flowchart showing an algorithm of software operating in one ray gun toy 1 in the case where two players play the game without use of the identifier, wherein the signal processing circuit of FIG. 3 is realized using a microcomputer. In Step ST1, the ray gun toy 1 causes the radio signal transmitting section 37 to transmit a radio signal. A radio signal transmitted from another radio signal transmitting section 37 is received by the radio signal receiving section 39 of the ray gun toy 1 and processed (step ST2). The radio signal is constantly transmitted from the radio signal transmitting section 37. Correspondingly, the radio signal receiving section 39 consecutively receives the radio signal, and determines the intensity of the received radio signal. Then, it is determined whether an emission instruction has been output or not (step ST3). Concretely, it is determined in step ST3 whether a player has operated the trigger portion 9 so as to allow the emission instruction generating section 23 to output an emission signal. When it is determined in step ST3 that the emission instruction has been output, the flow advances to step ST4, where an infrared ray signal is emitted from the infrared ray signal generating section 25. After the infrared ray signal is emitted in step ST4, the flow returns to step ST1, where the radio signal is transmitted once again. When it is determined in step ST3 that the emission instruction has not been output, the flow advances to step ST5, where it is determined whether the infrared ray signal emitted from another ray gun toy 1 has been received or not. When the determination result of step ST5 is NO, the flow returns to step ST1, where the radio signal is transmitted once again and repeats the transmission and reception processing of the radio signal until the emission instruction is output or infrared ray signal is received.

When the determination result of step ST5 is YES, the flow advances to step ST6, where it is determined, based on the determination result of the intensity of the radio signal received in step ST2, whether the parameter value used to determine the damage value needs to be changed or not. For example, when it is determined that the radio intensity exceeds a predetermined level, it is determined that the parameter value needs to be changed and, otherwise, it is determined that the change of the parameter value is unnecessary. When it is determined that the parameter value needs to be changed, the parameter value is changed (step ST7) followed by calculation of the damage value in step ST8. When it is determined in step S6 that the change of the parameter value is unnecessary, the parameter value is not changed and then the damage value is calculated in step ST8. In step ST9, an accumulation of the damage value calculated in step ST8 is calculated and the damage state is determined based on the accumulation. In step ST10, the damage state is represented outside, and the processing concerning the damage ends. In step ST11, it is determined whether accumulation of the damage value has exceeded a certain value or whether an input indicating the end of the game has been made by a player or not. When the input has not been made, the flow returns to step ST1, where the radio signal is transmitted once again. When the input indicating the end of the game has been made, the game ends. The above algorithm is merely an example and, actually, the order between the output processing and input processing of the infrared ray signal may be reversed. Further, any algorithm may be adopted as long as the parameter value can be changed depending on the radio intensity.

Figure 5:
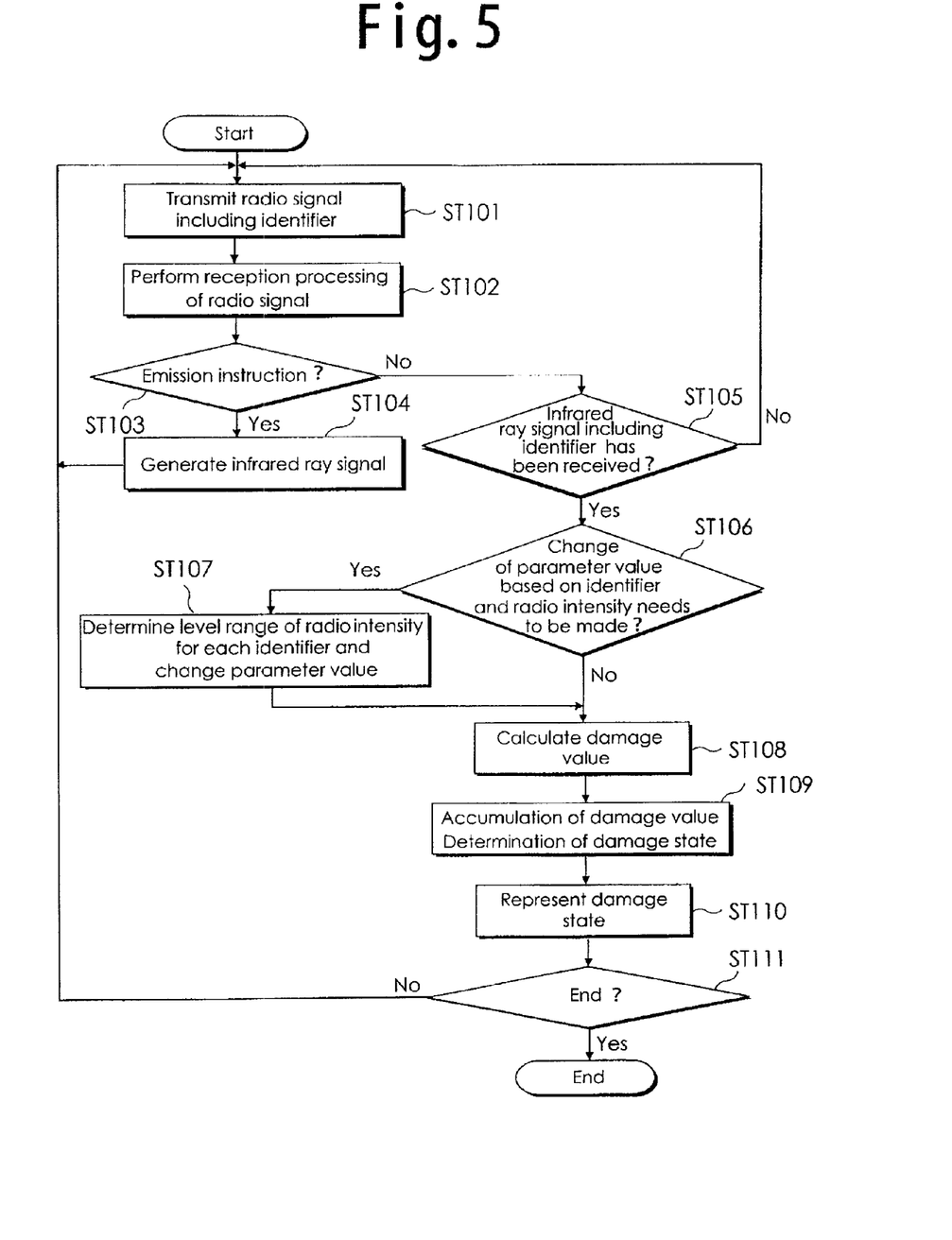
FIG. 5 is a flowchart showing an algorithm of a program used in the case where the embodiment of FIG. 1 is realized using a ray gun toy that uses identifier.
Figure 6:
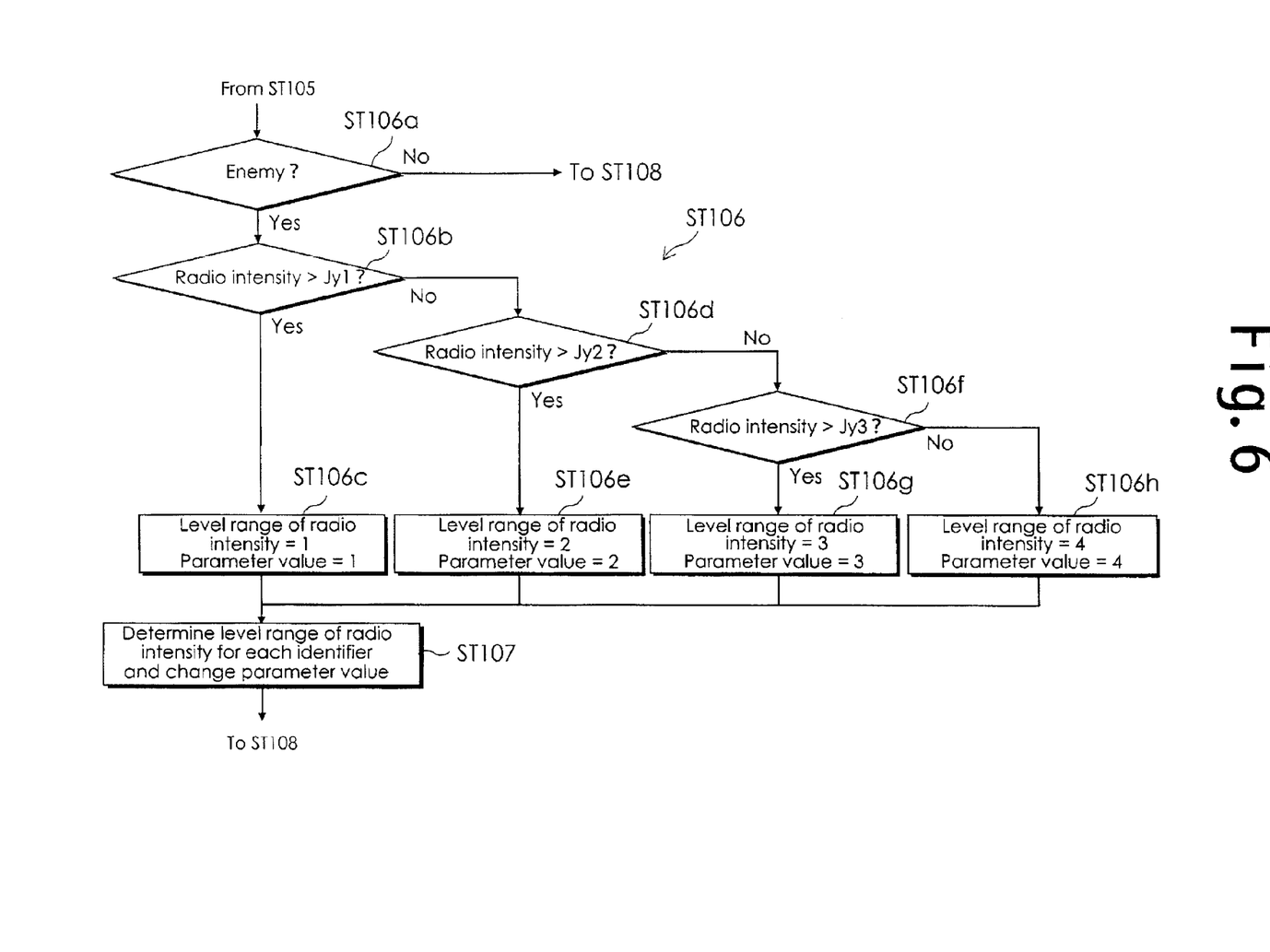
FIG. 6 is a flowchart showing an algorithm of a program that determines and records the level range of radio intensity for each identifier in the case of being realized by using a ray gun toy with an identifier.

FIG. 5 is a flowchart showing an example of an algorithm of software used in the case where the identifier is added for each ray gun toy 1 and players divided into friends and enemies perform the game. FIG. 6 is a flowchart showing the detail of a part of processing to be performed in the flowchart of FIG. 5. As shown in the flowchart of FIG. 5, in step ST101, the radio signal including the identifier is transmitted. The identifier includes group information indicating a group to which a player of the ray gun toy 1 belongs, as well as information for identifying the ray gun toy 1. The radio signal including the identifier is constantly transmitted from the radio signal transmitting section 37. Correspondingly, the radio signal receiving section 39 consecutively receives the radio signal including the identifier. In step ST102, the radio signal receiving section 39 receives the radio signal including the identifier from the radio signal transmitting section 37 of another ray gun toy 1, and the intensity of the received radio signal is determined. Further, in step ST102, the level range of the radio intensity is determined based on the determined intensity of the radio signal and is stored together with the identifier. The processing from step ST103 to step ST105 is the same as the processing from step ST3 to step ST5 of FIG. 4, so the description thereof is omitted here.

When the infrared ray signal including the identifier is received in step ST105, the flow advances to step ST106, where the parameter value is determined based on the identifier. Further, in step ST106, it is determined, based on the level range of the radio intensity determined in step ST102, whether the parameter value needs to be changed or not.

FIG. 6 is a flowchart showing processing performed in step ST106 of FIG. 5. In step ST106a, it is determined, based on the identifier included in the infrared ray signal, whether a target or an opponent is a friend or an enemy. It is assumed for signal processing, in this example, that the damage value of a player is not increased when being attacked by a friend. When it is determined, in step ST106a, that an attack has been made by an enemy, the flow advances to step ST106b. On the other hand, when it is determined that an attack has been made by a friend, the flow advances to step ST108 of FIG. 5. In step ST106b, the intensity of the radio signal is determined, and radio intensity for each identifier is determined, whereby the parameter value is determined. In step ST106b, it is determined whether the intensity of the radio signal is larger than a prescribed intensity Jy1. When the radio signal intensity is larger than the Jy1, the level range of the radio intensity is determined to be 1 (Lr=1), and the parameter value is set to 1 (step ST106c). When the radio signal intensity is not larger than the Jy1, the flow advances to step ST106d. In step ST106d, it is determined whether the intensity of the radio signal including the same identifier as that included in the infrared ray signal is larger than a prescribed intensity Jy2 or not. When the radio signal intensity is larger than the Jy2, the level range of the radio intensity is determined to be 2 (Lr=2), and the parameter value is set to 2 (step ST106e). When the radio signal intensity is not larger than the Jy2, the flow advances to step ST106f. In step ST106f, it is determined whether the intensity of the radio signal including the same identifier as that included in the infrared ray signal is larger than a prescribed intensity Jy3 or not. When the radio signal intensity is larger than the Jy3, the level range of the radio intensity is determined to be 3 (Lr=3), and the parameter value is set to 3 (step ST106g). When the radio signal intensity is not larger than the Jy3, the flow advances to step ST106h, where the level range of the radio intensity is determined to be 4 (Lr=4), and the parameter value is set to 4. In step ST107, the level range of the radio intensity determined for each identifier is determined to change the parameter values into the parameter values set in steps ST106c, ST106e, ST106g, and ST106h. The expression "for each identifier" means "for each player". That is, in the case where a plurality of enemies exists, the level range of the radio signal intensity is determined for each player based on the identifier included in the infrared ray signal. With this configuration, it is possible to recognize that the damage has been caused by whose attack, so that an attack result can be notified to an opponent. The processing from step ST108 to step ST111 is substantially the same as the processing from step ST8 to step ST11 of FIG. 4, so the description thereof is omitted here.

The configuration of the software may be changed such that when the infrared ray signal from the ray gun toy 1 of a friend is received, the parameter value for determining the damage value is set to 0 or, as a penalty, set larger than the parameter value set in the case where the infrared ray signal is received from the ray gun toy 1 of an enemy.

Figure 7:
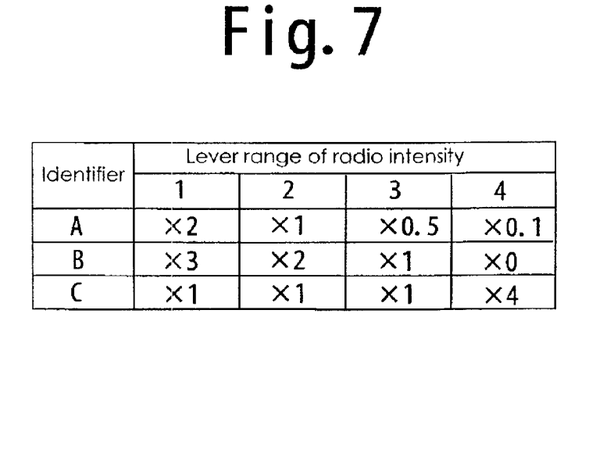
FIG. 7 is a view showing an example in which the parameter value is set depending on the level range of the radio intensity and identifier.

Any suitable way of changing the parameter value according to the level range of the radio intensity may be used, and a change pattern of the parameter value may be created in combination with the identifier. FIG. 7 shows an example of a change pattern of the parameter value in the case where the change pattern of a plurality of parameter values is set depending on the type of the ray gun toy 1. In FIG. 7, the change pattern of the parameter value is set depending on three identifiers from A to C. In the case where the identifier included in a received signal Ls A or B, the parameter value becomes larger as the radio intensity increases (as the level range (Lr) of the radio signal approaches 1). With this setting, the smaller the distance from the ray gun toy 1 of an enemy, the larger the damage. Conversely, as in the case of the identifier C, the parameter value may become smaller as the radio intensity increases.

Figure 8:
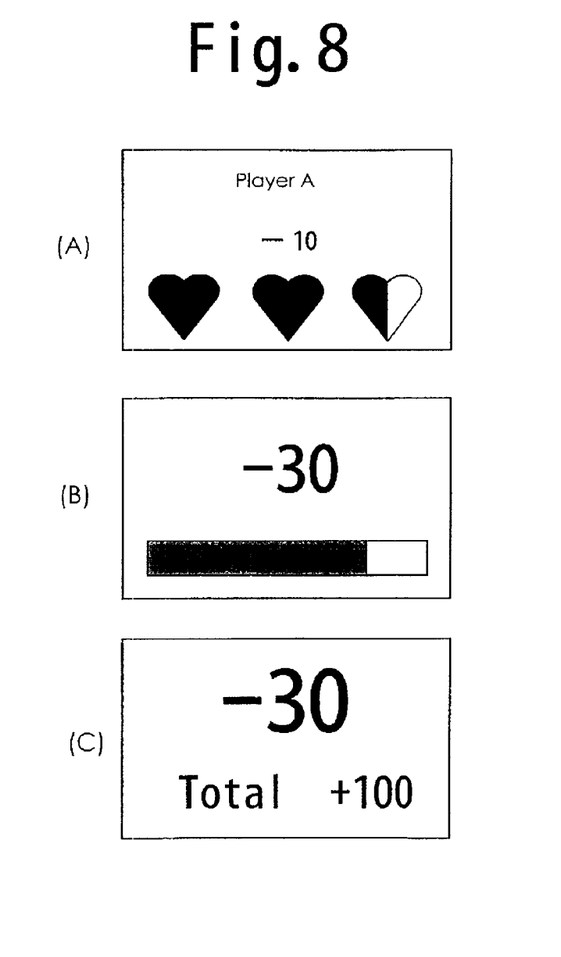
FIGS. 8(A) to 8(C) are views each showing an example of a display screen on which a damage value or damage state of a shooting toy of player which has received an infrared ray signal is displayed.

Any suitable way of displaying the damage value and/or damage state on the display screen 13 may be used. FIGS. 8(A) to 8(C) each shows an example of displaying the damage value and/or damage state using a figure and a gauge. When the identifier is included in the infrared ray signal and/or radio signal as in the case shown by the algorithm of FIG. 5, the identifier of a player of enemy group that has emitted the infrared ray signal can be displayed together with the damage value and/or damage state.

Figure 9:
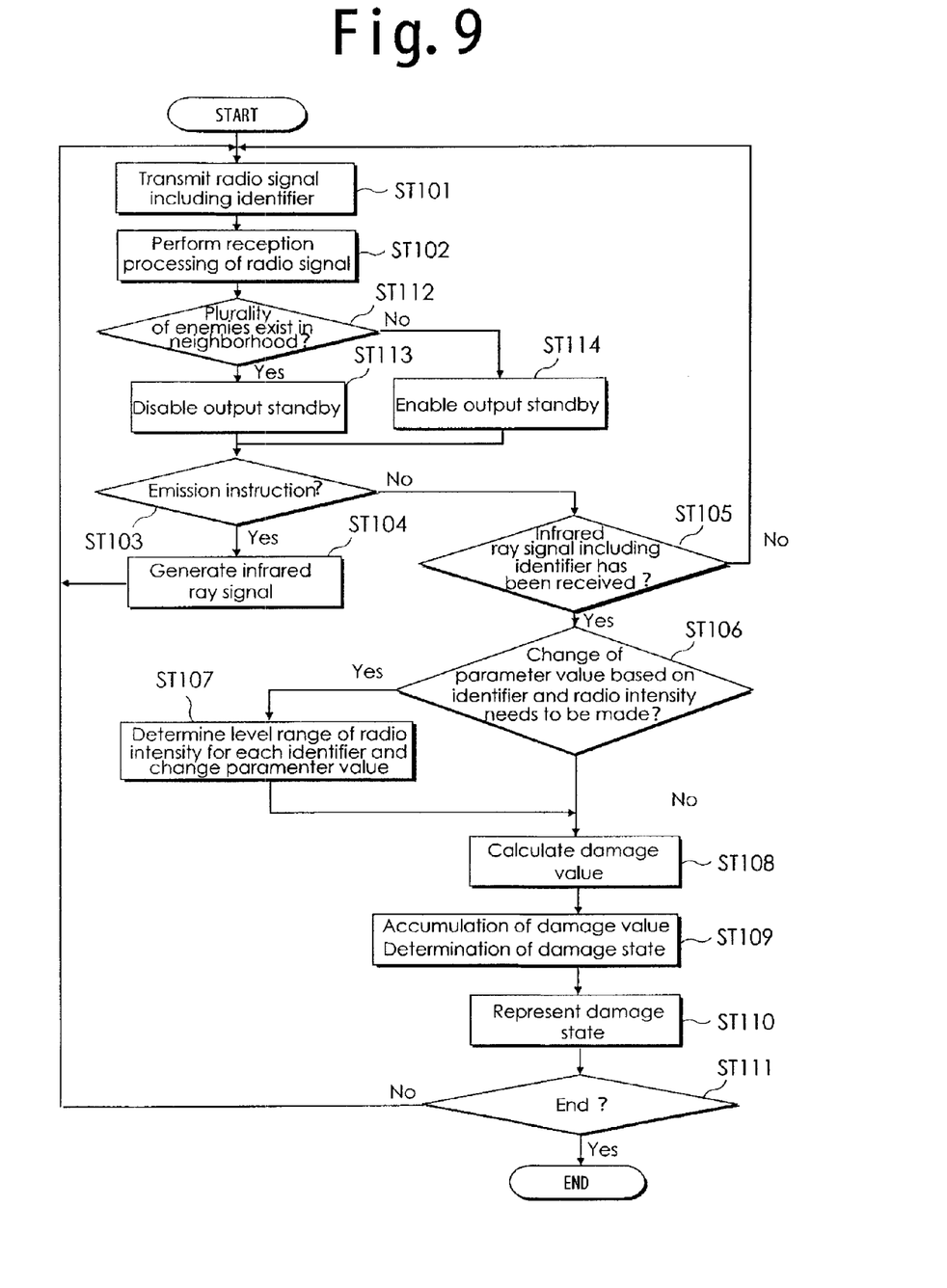
FIG. 9 is a flowchart showing an algorithm of a program used in the case where players of enemy group exist within a certain distance.

FIG. 9 shows an algorithm of software used in the case where the damage state is determined based on a concept that consecutive attacks from a plurality of enemies in the neighborhood (in close combat) are validated, while consecutive attacks from distant enemies (in non-close combat) are invalidated. In the algorithm of FIG. 9, steps ST112 to ST114 are inserted between steps ST102 and ST103 of the algorithm of FIG. 5. When it is determined in step ST112 that a plurality of enemies do not exist in the neighborhood of a player, the flow advances to step ST114 where the infrared ray signal receiving section 31 of the ray gun toy 1 of the player enters "output standby enable state" to be described later. On the other hand, when it is determined in step ST112 that a plurality of enemies exist in the neighborhood of a player, the flow advances to step ST113 where the infrared ray signal receiving section 31 of the ray gun toy 1 of the player enters "output standby disable state". The determination of step ST112 is made by the radio intensity determining section 41 shown in FIG. 3. When this algorithm is realized, a function of determining whether the radio intensities of a plurality of radio signals are larger than a predetermined radio intensity level is added to the radio intensity determining section 41. Further, in this example, an output standby function and a disabling function are added to the infrared ray signal receiving section 31. The output standby function does not output a signal indicating a reception of an infrared ray signal during a time period from a reception of a previous infrared ray signal until a predetermined time has elapsed after the reception, even if a new infrared ray signal is received at the time period. The disabling function disables the output standby function while a cancellation signal is output from the radio intensity determining section 41. Further, a function of outputting the cancellation signal is added to the radio intensity determining section 41. With this function, when determining that the radio intensities of a plurality of received radio signals are larger than a predetermined radio intensity level, the radio intensity determining section 41 outputs the canceling signal. The cancellation signal is output when the radio intensities of a plurality of received radio signals are larger than a prescribed level so as to disable the output standby function of the infrared ray signal receiving section 31. When the radio intensities of a plurality of received radio signals are not larger than a prescribed level (when enemies do not exist in the neighborhood), the output standby function provided in the infrared ray signal receiving section 31 is enabled to cause the infrared ray signal receiving section 31 to enter "output standby enable state". In the "output standby enable state", once the infrared ray signal receiving section 31 receives an infrared ray signal, it does not output a signal indicating reception of subsequent infrared ray signal until a predetermined time has elapsed after the reception of the first infrared ray signal, even if the infrared ray signal receiving section 31 receives the subsequent infrared ray signal. That is, in the "output standby enable state", the reception of an infrared ray signal is disabled during a predetermined time period. Therefore, during the "output standby enable state", consecutive attacks from a plurality of enemies are invalidated. On the other hand, when the radio intensities of a plurality of radio signals are larger than a prescribed level (when enemies exist in the neighborhood), the cancellation signal output from the radio intensity determining section 41 allows the infrared ray signal receiving section 31 to exert the disabling function. The disabling function disables the output standby function while the infrared ray signal receiving section 31 receives the cancellation signal to maintain the infrared ray signal receiving section 31 in the "output standby disable state". In the "output standby disable state", the abovementioned restriction of "predetermined time period" is cancelled. That is, in the case where consecutive attacks are made by a plurality of enemies and, correspondingly, the infrared ray signal receiving section 31 consecutively receives infrared ray signals, the damage value is determined based on all the received infrared ray signals. With this configuration, a cooperative or collaborative attack by a plurality of friends may be made in close combat, when the enemies exist in the neighborhood. Concretely, the infrared ray signal receiving section is generally set in the "output standby enable state" and is made to be in the "output standby disable state" while the infrared ray signal receiving section 31 receives the cancellation signal from the radio intensity determining section 41.

In place of adding the output standby function and disabling function to the infrared ray signal receiving section 31, a determination standby function and a disabling function may be added to the damage value determining section 35. The determination standby function does not determine the damage value during a time period from the time when the infrared ray signal receiving section 31 receives a previous infrared ray signal until a predetermined time has elapsed after the reception, even if the infrared ray signal receiving section 31 receives a new infrared ray signal at the time period. The disabling function disables the determination standby function while a cancellation signal is output from the radio intensity determining section 41. When the radio intensities of the received radio signals are not larger than a prescribed radio intensity level (when enemies do not exist in the neighborhood), the determination standby function provided in the damage value determining section 35 is enabled to cause the damage value determining section 35 to enter "determination standby enable state". In the "determination standby enable state", once the infrared ray signal receiving section receives an infrared ray signal, the damage value determining section 35 does not determine the damage value for subsequent infrared ray signal until a predetermined time has elapsed after the reception of the first infrared ray signal, even if the infrared ray signal receiving section 31 receives the subsequent infrared ray signal. That is, in the "determination standby enable state", the damage value is disabled or invalidated during a predetermined time period. Therefore, during the "determination standby enable state", consecutive attacks from a plurality of enemies are invalidated. On the other hand, when the radio intensities of the received radio signals are larger than a prescribed radio intensity level (when enemies exist in the neighborhood), the cancellation signal output from the radio intensity determining section 41 allows the damage value determining section 35 to exert the disabling function. The disabling function disables the determination standby function while the damage value determining section 35 receives the cancellation signal to maintain the damage value determining section 35 in the "determination standby disable state". In the "determination standby disable state", the abovementioned restriction of "predetermined time period" is cancelled. With this configuration, a cooperative or collaborative attack by a plurality of friends may be made in close combat, when the enemies exist in the neighborhood. Concretely, the damage value determining section 35 is generally set in the "determination standby enable state" and is made to be in the "determination standby disable state" while the damage value determining section 35 receives the cancellation signal from the radio intensity determining section 41. In this case, an algorithm substantially the same as that shown in FIG. 9 can be used. That is, it is only necessary to change step ST 113 "disable output standby" and step ST114 "enable output standby" in the algorithm of FIG. 9 to "enable determination standby" and "disable determination standby".

Figure 10:
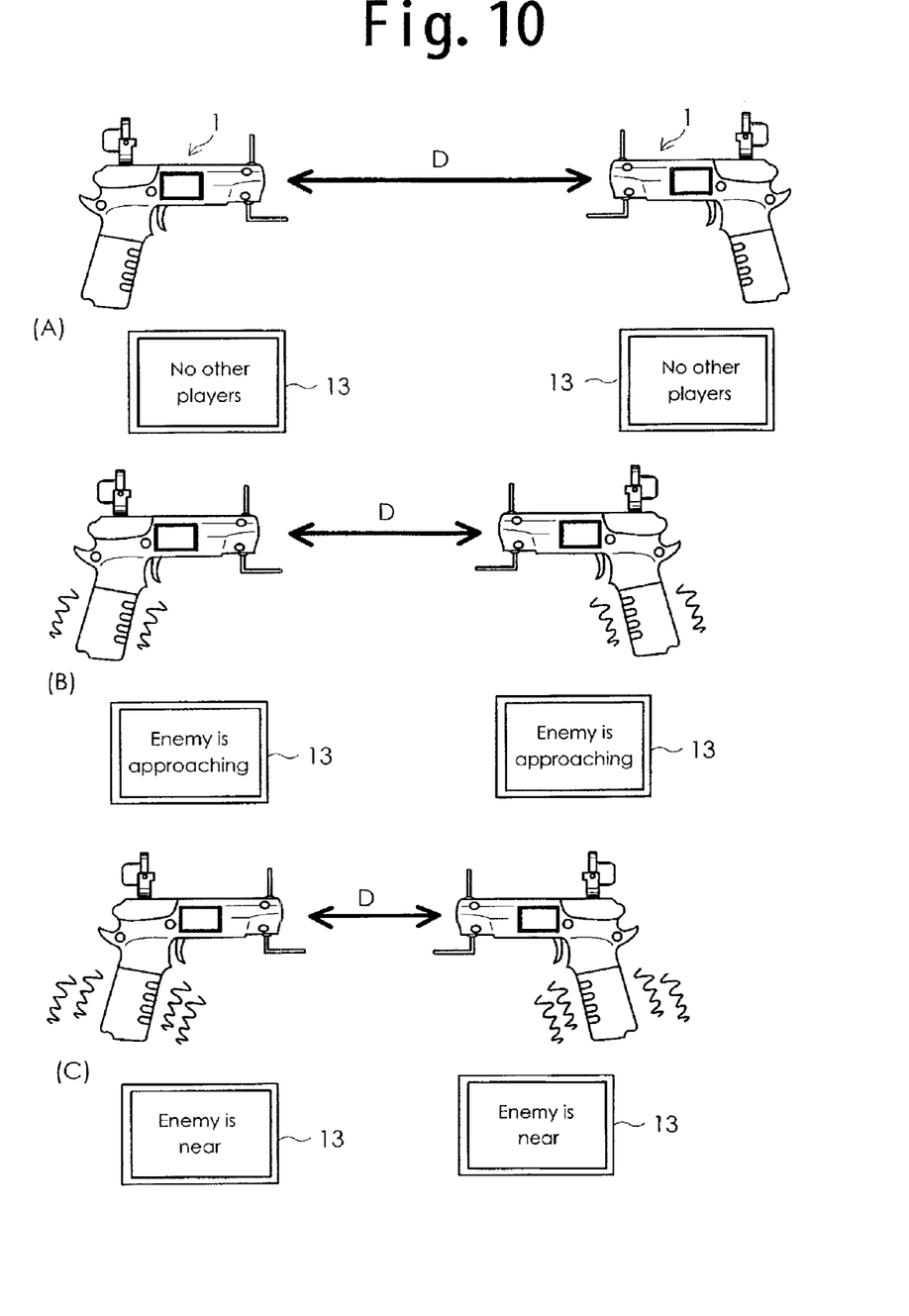
FIGS. 10(A) to 10(C) are views each showing a state where information concerning the distance from a player of enemy group is represented outside.

Any suitable mode may be used to represent to a player a state that enemies exist around him. FIGS. 10(A) to 10(C) each show an example in which information concerning the distance between two ray gun toys 1 of the players is displayed on the display screen 13 and represented as a vibration based on the radio intensity information. FIG. 10(A) shows a display example when a distance D between the two ray gun toys 1 is large, wherein no variation is generated. FIG. 10(B) shows a display example when the distance D has become shorter, wherein a slight vibration is generated. FIG. 10(C) shows a display example when the two ray gun toys 2 are very close to each other, wherein the vibration becomes strong. Any suitable information or mode to be displayed on the display screen 13, such as characters, figures, gauge, or change of color may be used properly. In the case where the sound generating section 45 is used to make sound representation, the damage value, damage state, damage value of another player, damage state of another player, or radio intensity based on the radio intensity display instruction can be represented outside, in a distinguishable manner, by changing the length, tone, or volume of the sound. In the case where the vibration generating section 43 is used, the damage value, damage state, damage value of another player, damage state of another player, or radio intensity based on the radio intensity display instruction can be represented outside, by changing of the length of time, level, or pattern of the vibration.

As the embodiment described above, by determining the intensity of the radio signal emitted from another player or a toy of another player, it is possible to determine the distance from another player or toy of another player and to reflect the determined distance in the game. Thus, the players can actually sense the thrill of close combat, preventing the game from being monotonous.

Industrial Applicability

According to the present invention, the parameter value used for determining the damage value is changed depending on the distance between toys. As a result, the player can confirm the damage value or damage status through the damage state representing section and thus can play the shooting game while actually thrilled of close combat.

The invention claimed is:

1. A shooting toy used in a game for two or more players comprising:
    an infrared ray signal generating section that generates an infrared ray signal for shooting;
    an infrared ray signal receiving section that receives an infrared ray signal generated by a shooting toy of a different player;
    a damage value determining section that determines a damage value based on a parameter value when the infrared ray signal receiving section receives the infrared ray signal;
    a damage state determining section that determines a damage state based on the damage value;
    a damage state representing section that represents the damage value and the damage state such that they may visually, aurally, or tactually be confirmed;
    a radio signal generating section that generates a predetermined radio signal;
    a radio signal receiving section that receives a radio signal generated by the shooting toy of the different player;
    a radio intensity determining section that determines a radio intensity of the radio signal received by the radio signal receiving section; and
    a vibration generating section that vibrates the shooting toy while the radio intensity determining section is recognizing the radio intensity at or beyond a predetermined level, wherein
    the damage value determining section changes the parameter value according to determination result made by the radio intensity determining section;
    the damage state determining section determines the damage state based on an accumulation of the damage values, or based on a value obtained by subtracting the damage value from a predetermined value;
    the infrared ray signal generating section generates the infrared ray signal including identifier to identify a source of the infrared ray signal;
    the radio signal generating section generates the radio signal including identifier to identify a source of the radio signal; and
    the vibration generating section has a function of varying a vibration such that the vibration increases with the increasing radio intensity.

2. The shooting toy used in a game for two or more players according to claim 1, wherein the damage value determining section further has a function of examining the identifier and a function of changing the parameter value based on the identifier.

3. The shooting toy used in a game for two or more players according to claim 2, further comprising an identifier examining section that examines the identifier, wherein
    the radio signal generating section further has a function of including in the radio signal a notification that indicates the damage state to the shooting toy of the different player who has generated or transmitted the identifier examined by the identifier examining section.

4. The shooting toy used in a game for two or more players according to claim 3, wherein the radio signal generating section generates the radio signal that includes the notification indicating the damage state to the shooting toy of the different player who has generated or transmitted the identifier examined by the identifier examining section when the infrared ray signal receiving section receives the infrared ray signal.

5. The shooting toy used in a game for two or more players according to claim 4, wherein
    the radio intensity determining section further has a function of outputting a disabling signal when it determines that radio intensities of a plurality of radio signals are at or beyond a predetermined radio intensity level; and
    the infrared ray signal receiving section has a function of standing by until a predetermined time passes after a previous infrared signal has been received, without outputting a signal indicating that a subsequent infrared ray signal is received even if the infrared ray signal is received, and a function of disabling the function of standing by while the radio intensity determining section is outputting the disabling signal.

6. A shooting toy used in a game for two or more players comprising:
    an infrared ray signal generating section that generates an infrared ray signal for shooting;
    an infrared ray signal receiving section that receives an infrared ray signal generated by a shooting toy of a different player;

a damage value determining section that determines a damage value based on a parameter value when the infrared ray signal receiving section receives the infrared ray signal;

a damage state determining section that determines a damage state based on the damage value;

a damage state representing section that represents the damage value and the damage state such that they may visually, aurally, or tactually be confirmed;

a radio signal generating section that generates a predetermined radio signal;

a radio signal receiving section that receives a radio signal generated by the shooting toy of the different player; and a radio intensity determining section that determines a radio intensity of the radio signal received by the radio signal receiving section, wherein the damage value determining section changes the parameter value according to determination result made by the radio intensity determining section.

7. The shooting toy used in a game for two or more players according to claim 6, wherein the damage value determining section changes the parameter value in linear or stepwise proportion to the radio intensity determined by the radio intensity determining section.

8. The shooting toy used in a game for two or more players according to claim 6, wherein the damage value determining section determines in which level range the radio intensity determined by the radio intensity determining section falls among two or more predetermined level ranges, and changes the parameter value according to the determined level range.

9. The shooting toy used in a game for two or more players according to claim 6, wherein the damage state determining section determines the damage state based on an accumulation of the damage values, or based on a value obtained by subtracting the damage value from a predetermined value.

10. The shooting toy used in a game for two or more players according to claim 6, wherein the infrared ray signal generating section generates the infrared ray signal including identifier to identify a source of the infrared ray signal.

11. The shooting toy used in a game for two or more players according to claim 6, wherein the radio signal generating section generates the radio signal including identifier to identify a source of the radio signal.

12. The shooting toy used in a game for two or more players according to claim 11, wherein the damage value determining section further has a function of examining the identifier and a function of changing the parameter value based on the identifier.

13. The shooting toy used in a game for two or more players according to claim 11, further comprising an identifier examining section that examines the identifier, wherein the radio signal generating section further has a function of including in the radio signal a notification that indicates the damage state to the shooting toy of the different player who has generated or transmitted the identifier examined by the identifier examining section.

14. The shooting toy used in a game for two or more players according to claim 11, wherein the radio signal generating section further has a function of including in the radio signal a notification that indicates the damage state to the shooting toy of the different player who has generated or transmitted the identifier examined by the identifier examining section; and the radio signal generating section generates the radio signal that includes the notification indicating the damage state to the shooting toy of the different player who has generated or transmitted the identifier examined by the identifier examining section when the infrared ray signal receiving section receives the infrared ray signal.

15. The shooting toy used in a game for two or more players according to claim 6, wherein the infrared ray signal generating section generates the infrared ray signal including identifier to identify a source of the infrared ray signal; and the radio signal generating section generates the radio signal including identifier to identify a source of the radio signal.

16. The shooting toy used in a game for two or more players according to claim 6, wherein the radio intensity determining section further has a function of outputting a disabling signal when it determines that radio intensities of a plurality of radio signals are at or beyond a predetermined radio intensity level; and the infrared ray signal receiving section has a function of standing by until a predetermined time passes after a previous infrared signal has been received, without outputting a signal indicating that a subsequent infrared ray signal is received even if the infrared ray signal is received, and has a function of disabling the function of standing by while the radio intensity determining section is outputting the disabling signal.

17. The shooting toy used in a game for two or more players according to claim 6, wherein the radio intensity determining section further has a function of outputting a disabling signal when it determines that radio intensities of a plurality of radio signals are at or beyond a predetermined radio intensity level; and the damage value determining section has a function of standing by until a predetermined time passes after the infrared ray signal section has received a previous infrared signal has been received, without determining the damage value even if a subsequent infrared ray signal is received, and has a function of disabling the function of standing by while the radio intensity determining section is outputting the disabling signal.

18. The shooting toy used in a game for two or more players according to claim 6, wherein the damage state representing section further includes an image display section provided with a display screen, and displays the damage value and/or the damage state on the display screen so as to be visually confirmed.

19. The shooting toy used in a game for two or more players according to claim 18, wherein the image display section further includes a radio intensity display command generating section that outputs a command necessary to display on the display screen the radio intensity determined by the radio intensity determining section so as to be visually confirmed.

20. The shooting toy used in a game for two or more players according to claim 6, further comprising a vibration generating section that vibrates the shooting toy while the radio intensity determining section is recognizing the radio intensity at or beyond a predetermined level.

21. The shooting toy used in a game for two or more players according to claim 20, wherein the vibration generating section has a function of varying a vibration such that the vibration increases with the increasing radio intensity.

* * * * *